United States Patent Office 2,901,193
Patented Aug. 25, 1959

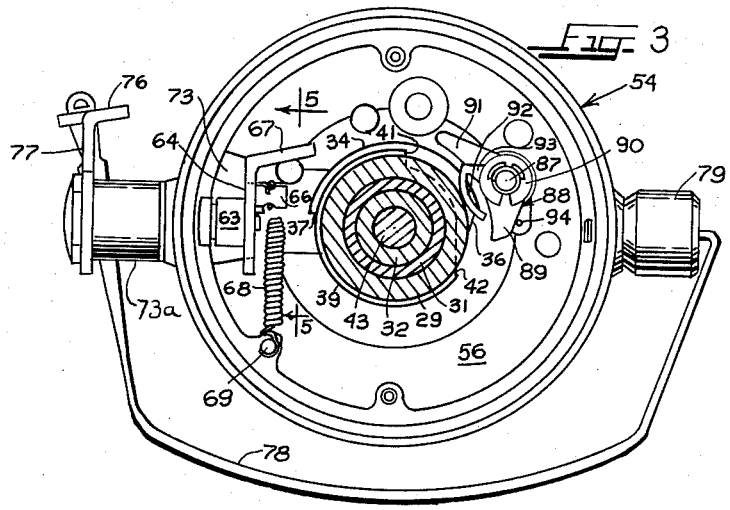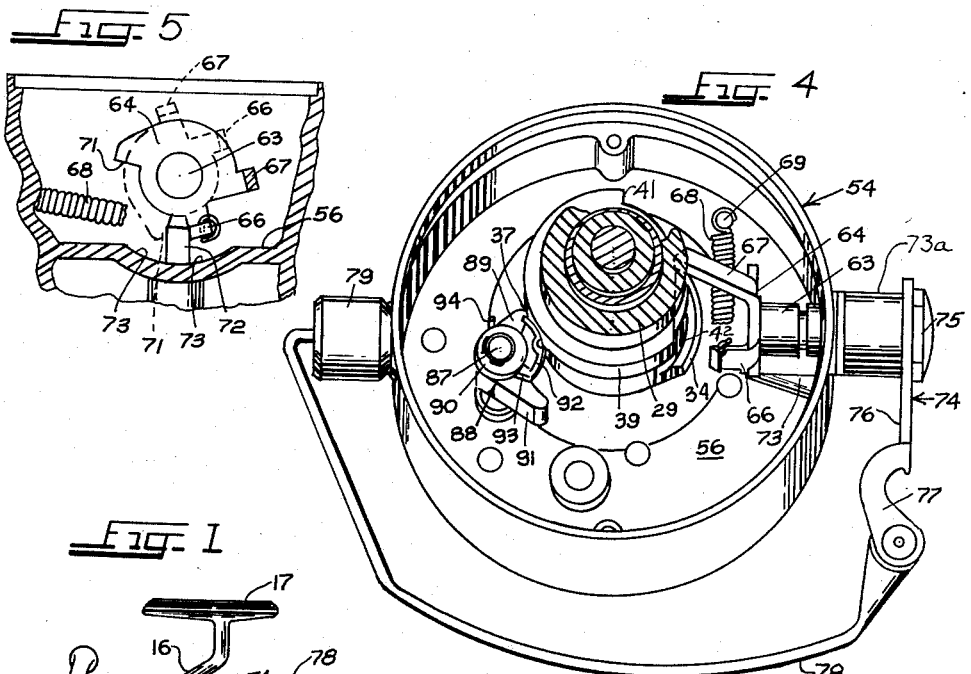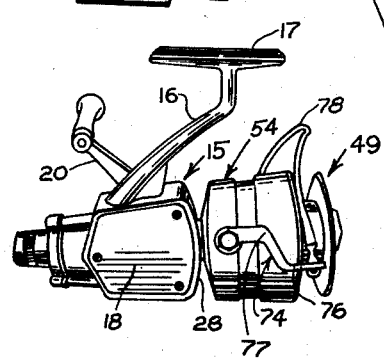

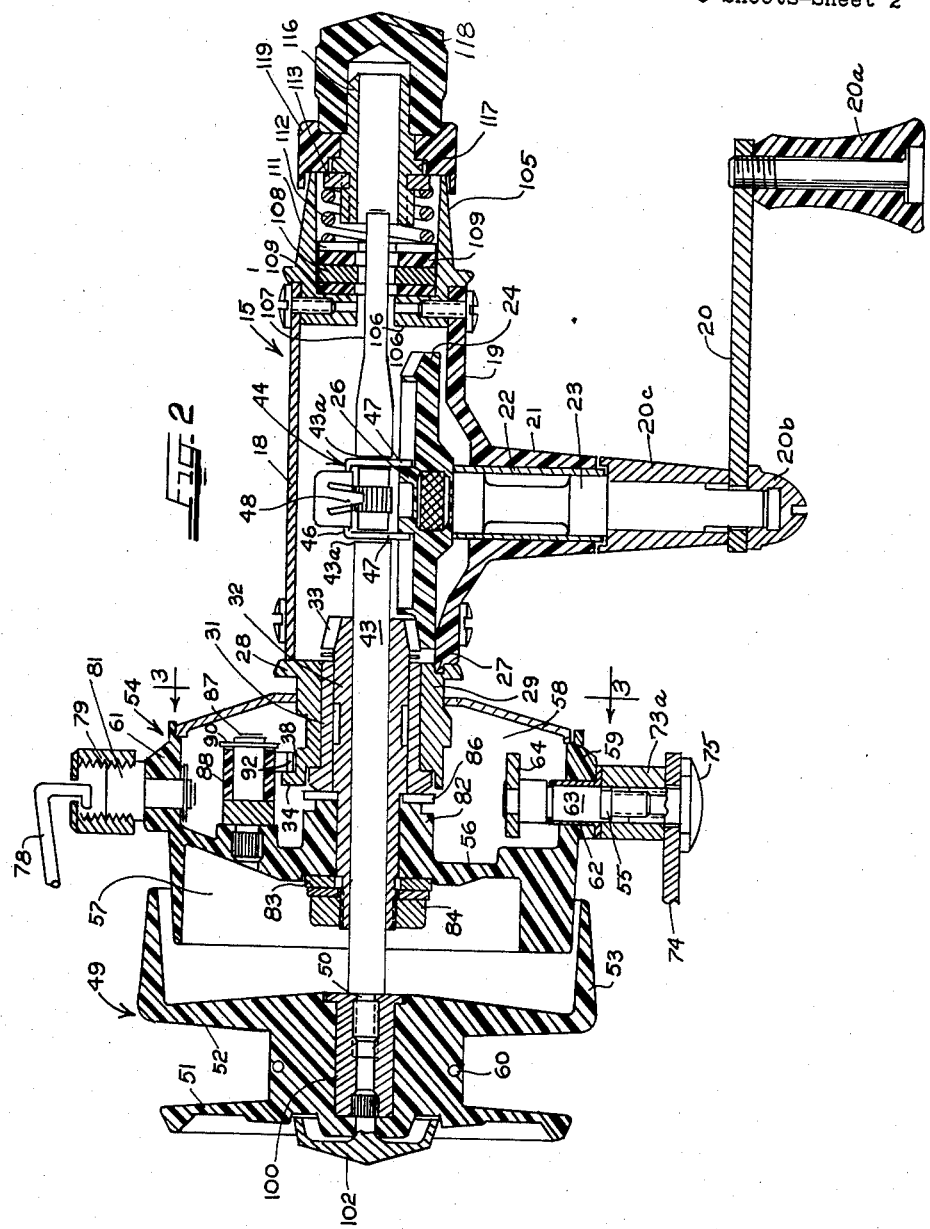

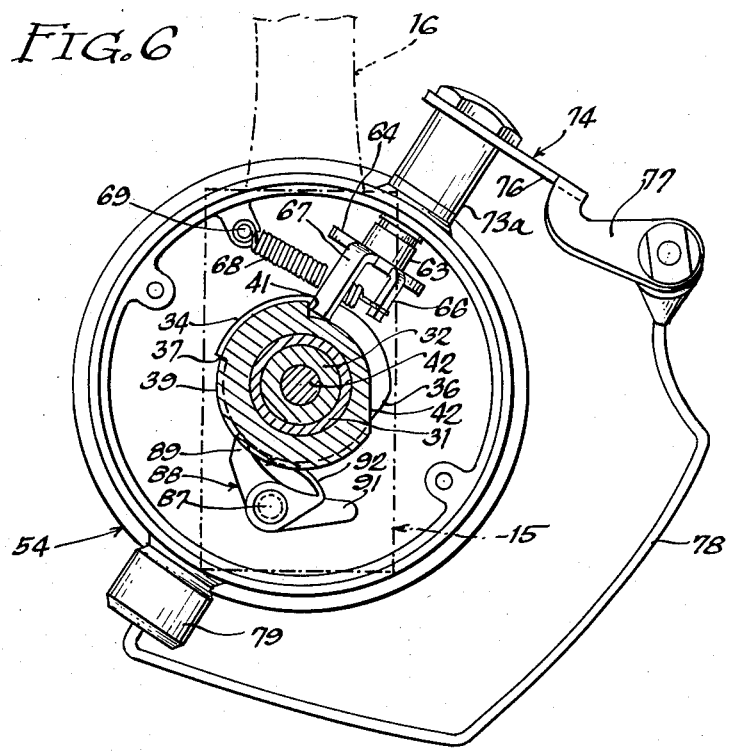

2,901,193
SPINNING TYPE FISHING REEL

William J. Askins and Howard R. Chapin, Park Ridge, Ill., assignors, by mesne assignments, to Sears, Roebuck and Co., Chicago, Ill., a corporation of New York Application October 22, 1956, Serial No. 617,561

1 Claim. (Cl. 242—84.21)

One of the objects of this invention is the provision of a spinning-type level wind fishing reel in which recovery of the line is effected through winding the line upon an axially reciprocable spool by a line guide member revolving about the spool.

Another object of this invention is the provision of a fishing reel of the foregoing type in which the line guide member may be manually selectively moved to line-retrieving or casting positions.

Another object of this invention is the provision of a fishing reel of the foregoing type in which the line guide member is automatically moved to line-engaging or pick-up position to retrieve the line, upon rotation of the crank handle of the reel in a forward direction.

Another object of this invention is the provision of means operable upon reverse rotation of the crank handle to arrest the revolution of the line guide member in a predetermined position so that it may be manually moved from such position always to assume the same line-disengaging position, for casting purposes, below the spool and out of interference with the path of travel of the ilne.

A further object of this invention is the provision of a spinning reel of the foregoing type which is simple and durable in construction and adapted to be readily assembled and disassembled for cleaning and repair purposes.

Further objects and advantages of this invention will become apparent from the following description when considered in connection with the accompanying drawings, in which Fig. 1 is a perspective view of a spinning type fishing reel in accordance with our invention.

Fig. 2 is a longitudinal horizontal cross-sectional view through the same.

Fig. 3 is a cross-sectional view taken substantially on line 3—3 of Fig. 2 and with a cover plate removed.

Fig. 4 is a perspective view taken substantially on the same line as Fig. 3 and looking in the direction of the arrows 3—3 but showing the parts in a different relation from that illustrated in Fig. 3.

Fig. 5 is a fragmentary cross-sectional view taken on line 5—5 of Fig. 3.

Fig. 6 is a cross-sectional view similar to Fig. 3 but showing the parts at the point where the line guide member is about to be caused to move to line-retrieving position.

Fig. 7 is a fragmentary perspective view of the forward portion of the housing.

Fig. 8 is an end-elevational view of the structure illustrated in Fig. 7.

Fig. 9 is a vertical cross-sectional view through a forward portion of the housing.

Referring to the drawings, our invention comprises a housing 15 shaped substantially as illustrated and provided with an integral upwardly extending arm 16 terminating in a mounting member 17 adapted to be secured to the underside of a fishing rod in a conventional manner. The housing 15 is provided on one side thereof with a removable cover plate 18. To the opposite side of the housing there is removably secured a cover plate 19 formed with an integral central hollow boss 21 arranged to receive a bushing 22 in which is journalled a drive shaft 23. Fixed on one end of said shaft is a drive gear 24 which is contained within the housing chamber, the said gear having on one face thereof a boss 26 eccentric to the axis of rotation of the gear 24. A crank lever 20 provided with a handle 20a is suitably keyed to the opposite end of the drive shaft 23 and secured as with a nut 20b engaging the threaded end of the shaft. A sleeve 20c covers the shaft portion between the lever 20 and the boss 21. The forward edge of the cover plate 19 is provided with projecting lip 27 adapted to be received in a cooperating recess provided in the forward wall 28 of the housing, the said recess and lip affording an interlocking arrangement which helps to minimize deflection of the cover plate 19 which may be caused by gear thrust. The housing 15 also includes integrally with the forward wall 28 a forwardly extending tubular portion 29 in which is fixed a flanged sleeve bearing 31 in which is journaled a tubular shaft 32 having an integral spur gear 33 at one end adapted to mesh with the drive gear 24.

A spool shaft 43 is supported in the tubular shaft 32 for rotation and reciprocation and is provided with a pair of spaced annular grooves 43a intermediate its ends, the said grooves cooperating with a yoke member 44 presently to be described. The said yoke member is of generally channel shape with the top web portion 46 thereof being cut away in its central area and with the side walls 47 of the said member being provided with alined recesses, the marginal edges of which engage in the annular grooves of the shaft. The said yoke member is thus locked to the shaft, while permitting rotation of the shaft relative to the yoke member. The side walls 47 of the yoke member are arranged in confronting relation to the face of the drive gear 24 and straddle the boss 26 thereon. As will be apparent when the drive gear 24 is rotated, axial reciprocation of the spool shaft 43 is effected. A portion of the surface of the spool shaft is serrated medially between the annular grooves and these serrations are adapted to be engaged by a spring finger 48 which is suitably riveted to the web portion of the yoke member. Thus, should the shaft 43, which under normal operating conditions is non-rotatable, be caused to be rotated, as will be hereinafter explained, an audible signal or clicking sound is produced. The structure described to this point is substantially similar to that described in copending application S.N. 523,190, now Patent Number 2,863,617, dated December 9, 1958.

At the extreme end of the tubular portion 29 there is provided on the peripheral surface thereof a relatively narrow raised portion or ridge 34 which subtends approximately a 180° angle with one end of said ridge affording a gradual slope as at 36 and the opposite end terminating abruptly and affording a stop or abutment 37 (Figs. 7 and 8). Immediately adjacent the ridge 34 there is a narrow band portion 38 on the peripheral surface, the said band portion being uniformly concentric in relation to the axis of the tubular portion and having a radius of curvature less than that of the ridge 34. Adjacent said band portion 38 there is a second ridge 39 which subtends an angle of approximately 240°, one end of said ridge terminating abruptly and affording a camming shoulder 41 for a purpose as will be hereinafter explained (Figs. 7 and 9). The other end 42 of said ridge merges gradually into the peripheral surface of the tubular portion providing a clearance zone between camming shoulder 41 and end 42. It is noted that the location of the clearance zone bears a particular relationship to that of the stop 37 as will be hereinafter explained.

The forward end 50 of the spool shaft 43 is of reduced diameter and is threaded to receive a line spool 49 which is arranged for threaded engagement with said shaft. The said spool includes forward and rearward flanges 51 and 52 respectively. The rearward flange 52 is provided with an integral rearwardly extending substantially cylindrical skirt portion 53 overlapping a portion of the flyer 54 hereinafter to be described. The hub of the spool 49 is provided with chordal apertures 60 through which one end of the line may be threaded for purposes of securing the same.

The flyer 54 is of generally cylindrical construction having an intermediate transverse wall 56 providing adjacent chambers 57 and 58. The cylindrical wall of the flyer on the rearward side of the transverse wall 56 is provided with diametrically opposed pierced bosses 59 and 61. In boss 59 there is fixed a bearing bushing 62 in which is journaled a stub shaft 63 on the inner end of which is fixed a member 64 shaped substantially like that illustrated in Figs. 3, 4 and 5. The said member includes a flat body portion having two spaced arms, 66 and 67, of unequal length with the shorter one 66 of said arms extending substantially at a right angle to the plane of the body portion and the longer one 67 of said arms extending angularly at slightly more than a right angle to the plane of the said body portion. The shorter arm 66 which is notched near its end has hooked thereto one end of a coiled tension spring 68, the other end of the spring being anchored to a pin 69 secured in the transverse wall 56. When the arm 66 is rocked to either over center position, the spring affords tension for maintaining the member 64 in the desired position. The body portion of the member 64 is also provided with a projection 71 affording an abutment which is adapted to cooperate with an abutment stop 72 provided on the face of the wall 56, the surface area portions 73 on the opposite sides of said abutment stop being recessed to afford clearance for the member 64 when the same is rocked about the axis of the shaft 63. Spaced from the end portion of the shaft 63 extending exteriorly of the cylindrical wall of the flyer 54 are provided opposed flats 55 and carried thereon is a spacer sleeve 73a having a cooperating double D axial bore. The outer end of said spacer sleeve is provided with a pair of opposed flats and carried thereon is one end of a bail arm 74, having a double D aperture, said arm being retained in position by internally threaded member 75 provided with a hexagon head and cooperating with the threaded end of the shaft 63. Thus, it will be apparent that the arm 74 and member 64 rock simultaneously as a unit.

The arm 74 is shaped substantially like that illustrated in Figure 1, with the forward portion 76 of the arm being bent in a plane at a right angle to the rearward portion 77 thereof, the said forward portion being adapted to secure one end of a wire bail 78, the opposite end of which is pivotally secured in a threaded cap member 79 cooperating with a screw member 81 fixed in the opposite boss 61. The transverse wall 56 of the flyer 54 is provided with a central boss 82 which is bored axially to receive the tubular shaft 32. The forward face of the transverse wall 56 is provided with a central circular recess having diametrically opposed slots. A washer 83 of similar configuration is arranged to be received within said recess and slots, said washer having a central aperture of double D formation ararnged to cooperate with the end of the tubular shaft 32 provided with opposed flats. It will be apparent that the flyer 54 is thus keyed to the tubular shaft 32 for rotation therewith and is held in assembled relation by means of a lock washer and nut 84. A spacing washer 86 is interposed between the central boss 82 and the end of the sleeve bearing 31. A post 87 is suitably anchored in the transverse wall 56 of the flyer 54 and extends in parallel relation to the shaft 43. Pivotally supported on said post is a pawl member 88 formed substantially as illustrated more clearly in Figs. 3 and 4 and secured as by a C-washer 90. The said pawl member includes a pair of angularly related arms 89 and 91 with the arm 89 terminating in a relatively sharp tooth. An arched resilient finger 92 is formed integrally with a boss 93 provided on the pawl member 88. The said finger is thus disposed in a plane parallel to but spaced from the plane of the arms 89 and 91. The finger 92 and arm 91 of the pawl member 88 comprise a greater mass than the arm 89 and therefore tend to bias the pawl member to swing in a counter-clockwise direction, as viewed in Fig. 3, the movement of the pawl member in such direction being limited by a pin 94 fixed in the transverse wall 56 and adapted to be engaged by the arm 89.

As will be seen clearly by reference to Fig. 2, the pawl member 88 is substantially in vertical alinement with the end of the tubular portion 29 so that the resilient finger 92 will engage the band portion 38 on the peripheral surface thereof while the arm 89 is adapted to ride over the adjoining ridge 34 and to engage the abutment 37 to arrest rotation of the flyer, as will be presently explained.

The resilient finger 92 is adapted always to frictionally engage the band portion 38 on the periphery of the tubular portion 29. The arched form of the finger 92 is in effect a section of a circle which is tangent to the band portion 38. Thus, as the flyer 54 is rotated by the crank lever 20, the pawl member 88 is caused to be revolved about tubular portion 29 in a counterclockwise direction, as viewed in Fig. 3 and the pawl member 88 is caused to rock slightly counterclockwise, about its own pivotal axis, to permit the arm 89 to ride freely over the ridge 34. However, when the flyer 54 is caused to be rotated in an opposite direction by rotation of the crank lever 20, the frictional engagement of the finger 92 with the band portion 38 effects a rocking of the pawl member 88 in an opposite direction so that the end of the arm 89 is caused to engage the abutment 37 and thus arrest rotation of the flyer 54 relative to the housing 15. Because the abutment 37 is fixed, the flyer 54 will always be caused to stop in the same position relative to the housing 15. In such position the pivotal axis of the bail 78 is substantially horizontal and the bail is in its uppermost position corresponding to line retrieving position.

Referring particularly to Fig. 3 it will be observed that when the bail 78 is in line retrieving position as illustrated in Fig. 3, the position of member 64 is such that the arm 67 thereof is substantially alined with ridge 34 although spaced therefrom. Such line retrieving position is determined by engagement of the arm 66 against abutment stop 72, Fig. 5. When the bail 78 is manually rocked to casting position the member 64 is correspondingly rocked and the arm 67 is revolved about the axis of shaft 63 to a position where the end of said arm is finally substantially in alinement with the ridge 39 (Fig. 4), the final position of the bail being determined by engagement of the shoulder 71 with the fixed abutment 72. It is noted however that except in the clearance zone of the ridge 39 the end of the arm 67 will engage against the ridge which acts as a barrier to prevent the arm 67 and correspondingly the bail 78 from reaching their respective final positions. However, when the flyer 54 is rotated relative to the housing to the position where the end of the arm 89 engages with abutment 37 the end of arm 67 will be alined with the clearance zone so that it may move freely into its final position. It will thus be apparent that the bail 78 may be manually moved to or from retrieving or casting position only when the flyer 54 is in a particular position relative to the housing that is where the pivotal axis of the bail is disposed in one horizontal position.

Our invention embodies the feature of automatic positioning of the bail from casting to line retrieving position merely upon rotation of the crank lever in a line winding direction. Upon rotation of the crank lever in a forward direction the flyer is caused to be rotated counter clockwise as viewed in Fig. 3. The arm 67 which is in the clearance zone during casting position is carried around to engage the camming shoulder 41 (Fig. 6). Continued movement of the flyer 54 effects a rocking of the member 64 to an over center position of the arm 66 so that the spring 68 may draw the member 64 to a position where the arm 66 engages against the abutment stop 72. The bail 78 is correspondingly rocked to assume a line retrieving position.

Referring to Fig. 2, the spool 49 is axially bored to receive a bushing 100 which is press-fitted therein. Said bushing is provided with an axial opening which is threaded at one end to cooperate with threaded end 50 of the spool shaft 43. Into the opposite end of said opening is press-fitted the shank of an ornamental knob 102. The spool, of course, may be easily removed and replaced by another spool carrying a line of different tensile characteristic.

The braking mechanism illustrated in Fig. 2 affords means for permitting automatic unwinding of spool 49 when the line is in tension, as when a fish is being "played." This provides a safety feature to insure against line breakage, since it is possible to adjust the braking action to a desired degree, the maximum condition of course being slightly below the breaking point of the line. Under such conditions tension on the line may cause the spool to rotate with unwinding of the line even while the crank handle is being turned in a line-retrieving direction.

The housing 15 is provided with an integral rearward extension 105 forming a cavity for the reception of the braking means presently to be described. A transverse wall portion 106 integral to the extension 105 is provided with a central aperture and separates the main body chamber from the brake cavity. Through this aperture extends the rearward end portion of the spool shaft 43, said end portion being provided with opposed milled flats 107 and passing through a disk brake element 108 provided with a double-D aperture. The said brake element 108 thus is keyed to the shaft but the shaft may move axially relative to the brake element. On opposite sides of the brake element 108 are disposed cooperating brake elements 109 each of which has a central aperture affording clearance for the end of brake spool shaft 43. As will be seen by reference to Fig. 2, one of the brake elements 109 abuts the wall portion 106 while a washer 111 is disposed contiguous to the face of the other brake element 109. A coil spring 112 is contained within the brake cavity and is confined between the washer 111 and a threaded washer 113. The washers 111 and 113 each have diametrically opposed lug extensions received in opposed longitudinal slots provided in the cavity. Accordingly, the said washers are keyed against rotation relative to the housing extension 105. A tubular member 116 provided with an intermediate annular shoulder 117 has a forward threaded portion which is adapted to cooperate with the threaded washer 113. The rearward end of the tubular member 116 is press-fitted into a knob 118 for permanent securement with a cap member 119 being retained between the shoulder 117 and the knob 118. The said cap member is arranged to engage over the end of the housing extension 105 and to be secured thereto as with screws. It will be apparent that the tubular member 116 and knob 118 thus are secured in captive rotatable relation to the housing 15 and that upon rotation of the knob and the tubular member, the the threaded washer 113 will be advanced or retracted axially, thereby compressing or expanding the spring 112 to vary the pressure between the cooperating surfaces of the braking elements.

In use and operation the reel is attached to a fishing rod at or relatively near the butt end of the rod with the longitudinal axis of the reel being disposed in parallel relation to the rod and with the spool 49 extending generally toward the rod tip. In this position the line is free to pass from the spool through the line guides carried on rod. In order to condition the reel for making a cast, the bail 78 must first be shifted to non-line engaging position as illustrated in Fig. 4. This is effected by turning crank 20 in a reverse direction to rotate the flyer 54 clockwise, as viewed in Fig. 4, to the point where movement of the flyer 54 is arrested by engagement of the pawl arm 89 with the shoulder 37. At this point the clearance zone in ridge 39 is alined with the path of travel of the end of arm 67 and the bail 78 now may be manually engaged and swung about its pivotal axis from line-retrieving position to the casting position illustrated in Fig. 4. In this latter position the end of arm 67 is disposed in the clearance zone. After a cast has been made, rotation of the crank 20 in a forward direction effects rotation of the flyer 54 in a counterclockwise direction, as viewed in Fig. 4. This action revolves the arm 67 into direct engagement with the shoulder 41, which effects a camming action on the arm 67 causing the member 64 and the bail 78 to rock about the axis of shaft 63 towards line-retrieving position, the spring 68 affording the necessary pull to complete the travel of the bail 78 when an over-center position of the arm 66 has been reached. With the bail 78 in line-retrieving position continued rotation of the crank 20 serves to reciprocate the spool 49 and revolve the bail 78 about the spool to distribute the line across the same in a manner well known in the art.

Various changes coming within the spirit of my invention may suggest themselves to those skilled in the art. Hence, I do not wish to be limited to the specific embodiments shown and described or uses mentioned, but intend the same to be merely exemplary, the scope of my invention being limited only by the appended claim.

We claim:

In a spinning type fishing reel, the combination of a housing having a generally cylindrical neck portion, said neck portion having a ridge extending circumferentially thereof over a part of the circumference with one end of said ridge affording an abutment, a flyer disposed adjacent to said neck portion and supported for rotation coaxially with said neck portion, a line retrieving member pivotally supported on said flyer and pivotal about an axis transverse to the axis of rotation thereof, an arm rigidly operatively connected with one end of said line engaging member, said arm being disposed eccentrically to the pivotal axis of said line retrieving member and being revolvable about said transverse axis, said arm extending towards said neck portion transversely thereof, the end of said arm when said line retrieving member is in casting position being disposed substantially in alignment with said ridge, said arm when said flyer is caused to be rotated being revolved into engagement with said abutment, the same effecting displacement of said arm and rocking of said line retrieving member into line retrieving position.

References Cited in the file of this patent

UNITED STATES PATENTS

| | | |
|---|---|---|
| 1,053,871 | Purdom | Feb. 18, 1913 |
| 2,599,189 | Mauborgne | June 3, 1952 |
| 2,736,979 | Le Gal | Mar. 6, 1956 |
| 2,783,952 | Clay | Mar. 5, 1957 |

FOREIGN PATENTS

| | | |
|---|---|---|
| 471,218 | Great Britain | Aug. 31, 1937 |
| 756,630 | Great Britain | Sept. 5, 1956 |